United States Patent [19]
Ames et al.

[11] 3,884,156

[45] May 20, 1975

[54] AUTOMATICALLY TRACTION EFFORT CONTROLLED CONVERTIBLE RAIL-HIGHWAY TRACTOR

[75] Inventors: Victor H. Ames; Marshall V. Hartelius, both of Midlothian, Ill.

[73] Assignee: Whiting Corporation, Harvey, Ill.

[22] Filed: Jan. 28, 1974

[21] Appl. No.: 437,283

[52] U.S. Cl............... 105/75; 105/26 R; 105/90 A; 105/215 C
[51] Int. Cl..... B61c 13/00; B61c 15/00; B61g 5/00
[58] Field of Search......... 105/26 R, 26.1, 75, 90 A, 105/215 C; 213/8, 43

[56] References Cited
UNITED STATES PATENTS

| | | | |
|---|---|---|---|
| 2,718,195 | 9/1955 | Bock et al.......................... | 105/75 X |
| 3,198,137 | 8/1965 | White, Jr. .......................... | 105/26 R |
| 3,388,928 | 6/1968 | Poker et al. .................... | 105/26.1 X |
| 3,399,633 | 9/1968 | Herscovitch...................... | 105/75 X |
| 3,540,381 | 11/1970 | White, Jr. ..................... | 105/26 R X |
| 3,633,514 | 1/1972 | Deike............................ | 105/90 A X |

*Primary Examiner*—Lloyd L. King
*Assistant Examiner*—Howard Beltran
*Attorney, Agent, or Firm*—Lockwood, Dewey, Zickert & Alex

[57] ABSTRACT

Device for automatically establishing a variable weight transfer load to the coupler of a road-rail tractor during pushing or pulling a rail car which includes a weight transfer cylinder connected between the coupler and rail wheels of the tractor and a hydraulic circuit for driving the cylinder wherein the hydraulic circuit includes control means responding to the traction needs of the tractor to vary the weight transfer load.

31 Claims, 10 Drawing Figures

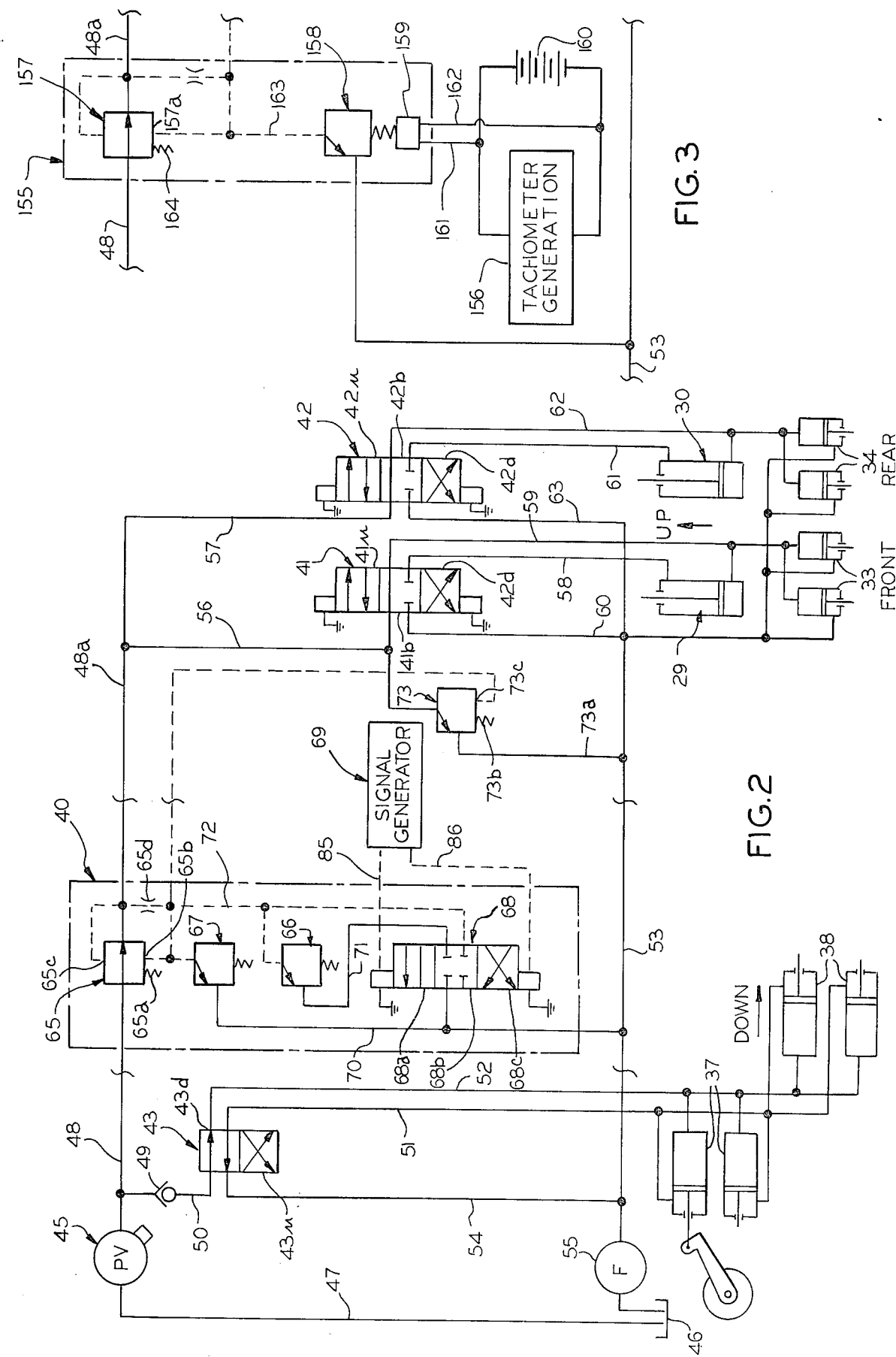

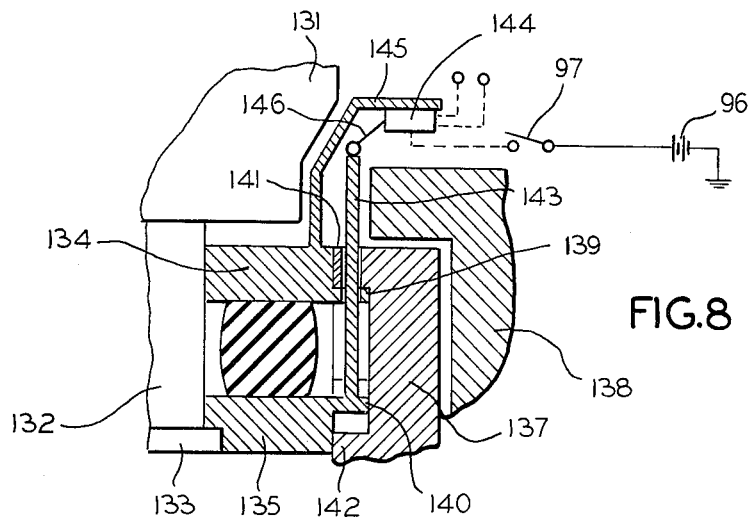
FIG.8
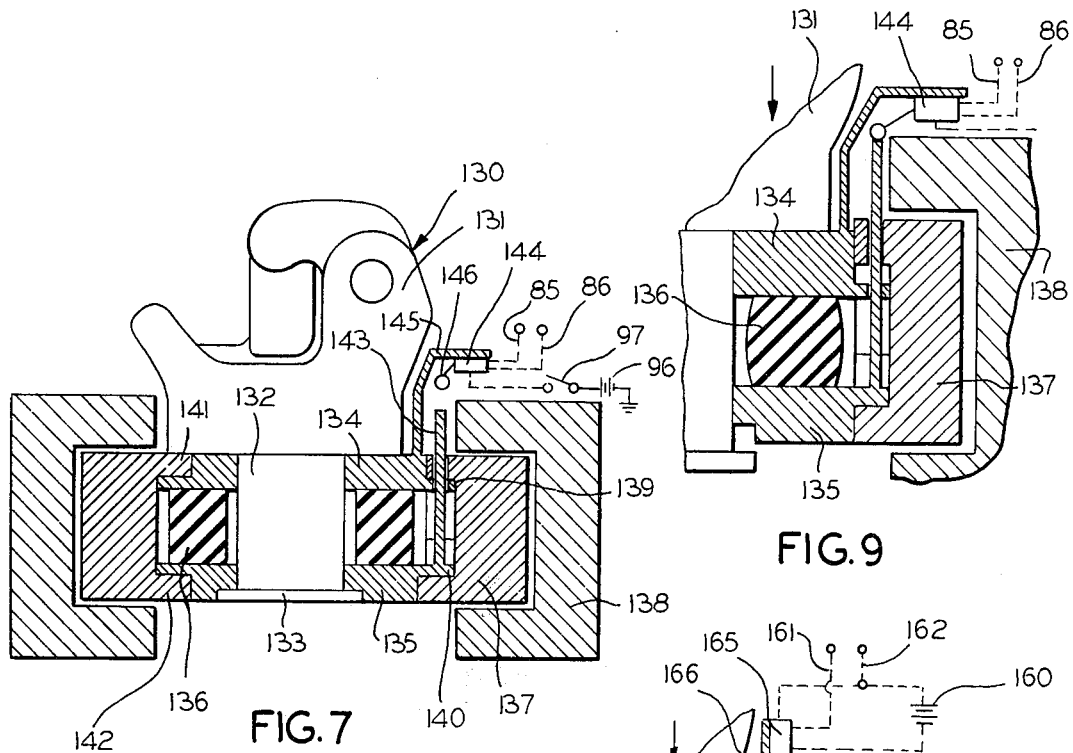
FIG.9
FIG.7
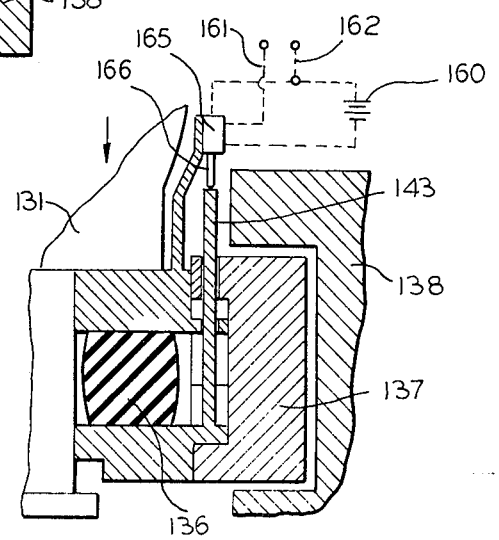
FIG.10

AUTOMATICALLY TRACTION EFFORT CONTROLLED CONVERTIBLE RAIL-HIGHWAY TRACTOR

This invention relates in general to a road-rail tractor, and in particular to a variable weight transfer device for a road-rail tractor coupler, and more particularly to a device for automatically varying the weight transfer load on a coupler of a road-rail tractor in response to the tractive load demands of the tractor.

Heretofore, where a road-rail tractor is employed to pull or push one or more rail cars, it has been known to transfer a portion of the weight of the rail car immediately coupled to the tractor through the coupler of a road-rail tractor to the traction wheels of the tractor to increase the tractive effort developed by the tractor as is especially necessary when initially applying a draft force to one or more rail cars for moving same so as to prevent slippage of the traction wheels of the tractor. The traction coupler is fitted with a weight transfer plate which engages the underside of the rail car coupler. Weight transfer is thereby accomplished by applying a force between the tractor coupler and the traction wheels of the tractor by a suitable means such as a hydraulic cylinder or the like, thereby applying a lifting force to the coupler of the rail car so that a portion of the weight of the rail car is transferred through the cylinder to the tractor traction wheels toward the rails to increase the traction between the wheels and the rails. This weight transfer allows the tractor to develop a tractive effort on the rails greatly in excess of that attributable to its own weight. Such weight transfer devices are illustrated in U.S. Pat. Nos. 2,721,522 and 3,198,137. However, these weight transfer devices either apply full weight transfer or no weight transfer. Full weight transfer is desired during starting to give maximum traction, while a lower weight transfer is adequate thereafter when the tractor and cars are moving and when less traction is needed. One of the difficulties experienced here involves a situation where full weight transfer, when the speed of the tractor and rail car reaches a given point, may damage the rail car or tractor when a sharp bump is encountered along the rails, such as at a joint between adjacent rail sections.

The present invention avoids the problems heretofore encountered by automatically changing the weight transfer as demanded in accordance with the traction demands of a rail tractor. For example, the automatic weight transfer device of the invention may respond to the speed of the tractor, the torque of the engine, the draft force on the tractor coupler, or the transmission operation. Variable weight transfer is accomplished by a unique hydraulic circuit which controls the pressure in the weight transfer or coupler cylinders.

It is therefore an object of the invention to provide a variable weight transfer device for rail tractors for automatically varying the magnitude of weight transfer in response to traction demands of the tractor.

A further object of the present invention is to provide a variable weight transfer device for road-rail tractors to eliminate possible damage to the rail car.

Another object of this invention resides in the provision of a variable weight transfer device for the coupler of a road-rail tractor which automatically varies the weight transfer from the rail car to the tractor in response to either the speed of the tractor, the engine torque of the tractor, the draft force on the tractor coupler, or the transmission operation.

Still another object of the invention is to provide a road-rail having the frame spring supported from the wheels and shock absorbers mounted between the frame and wheels with a variable hydraulically operated weight transfer device automatically responding to the traction demands of the tractor, wherein the shock absorbers are loaded with the weight transfer pressure to prevent bottoming of the springs.

A further object of the invention is to provide a unique hydraulic circuit for operating weight transfer cylinders on a road-rail tractor.

Other objects, features and advantages of the invention will be apparent from the following detailed disclosure, taken in conjunction with the accompanying sheets of drawings, wherein like reference numerals refer to like parts, in which:

FIG. 2 is a schematic diagram of a unique hydraulic circuit utilized for operating the road wheel and weight transfer coupler cylinders of the road-rail tractor shown in FIG. 1 and including one form of a hydraulic control responding to electrical signals for varying the weight transfer force applied to the coupler cylinders;

FIG. 3 is a partial schematic view of a modified hydraulic circuit for a tractor that is the same as that of FIG. 2 relative to the operation of the road wheel and coupler cylinders, but which includes a weight transfer control responsive to a tachometer generator that provides a stepless type of weight transfer forces;

FIG. 7 is a somewhat top plane and diagrammatic view of a tractor coupler which is constructed to operate switching for generating an electrical signal in response to the pushing or pulling draft forces being applied between the tractor and a rail car;

FIG. 8 is an enlarged fragmentary view of the coupler of FIG. 7 showing the switch operated when the coupler is under a pulling force;

Figure 1:
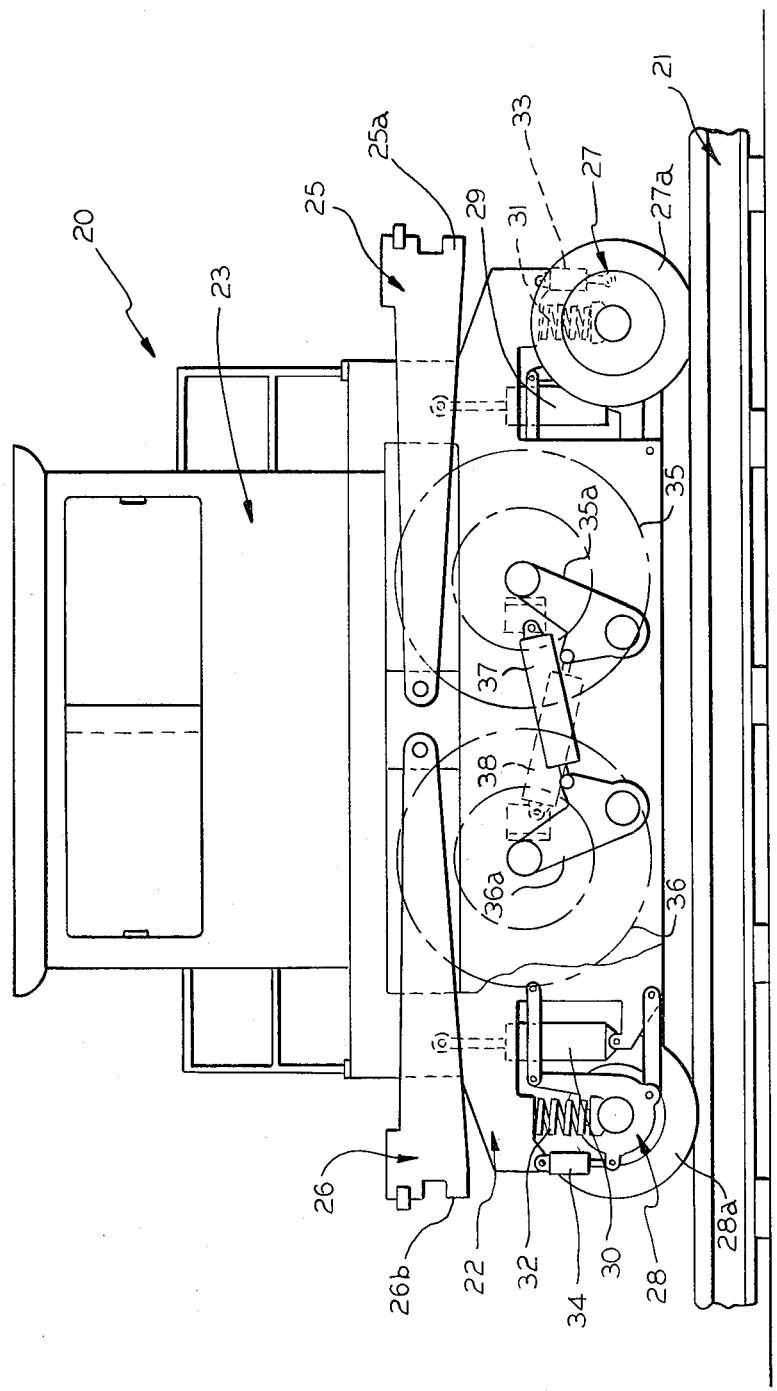
FIG. 1 is a somewhat diagrammatic view of a road-rail tractor supported on rails to facilitate the understanding of the present invention, wherein some parts are broken away, omitted, or shown in phantom.
Figure 6:
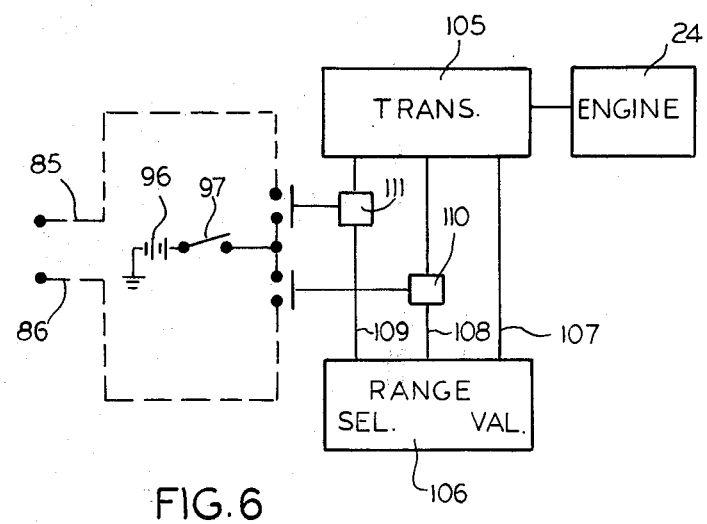
FIG. 6 is a schematic and block diagram of a still further form of a signal generating means applicable to the hydraulic portion of the weight transfer control in FIG. 2 and in particular where the signal is generated by the sensing of pressure in the transmission of the engine.

FIG. 9 is a view similar to FIG. 8 but showing the coupler operating under a pushing force; and FIG. 10 is a fragmentary view of a coupler similar to that of FIG. 7 but illustrating the use of a potentiometer that is actuated to generate the electrical signal for the hydraulic portion of the weight transfer control Referring now to the drawings and particularly to FIG. 1, a somewhat diagrammatic road-rail tractor is shown, for purposes of illustrating the application of the automatic weight transfer device of the present invention. The tractor is generally designated by the numeral 20 and is shown as it is adapted to be used on tracks or rails 21 for pulling or pushing one or more rail cars. The tractor generally includes a frame 22 having a cab 23 mounted thereon in which the operator rides and controls the tractor. An engine 24, not shown in FIG. 1 but illustrated in block form in connection with the embodiment of FIG. 6, is also mounted on the frame 22 for providing power to the drive wheels of the tractor in a manner like that shown in the above-mentioned patents. Front and rear couplers 25 and 26 extend from the frame 22, each of which includes the usual weight transfer plates 25a and 26b, although only one coupler need be provided if desired.

Weight from a rail car is transferred through a coupler to the tractor rail wheels by the weight transfer plate. Suitably supported at each end of the frame 22 are wheel and axle assemblies 27 and 28 mounting rail wheels 27a and 28a that are suitably driven by the engine 24 of the tractor. The couplers are pivotally mounted on the frame so that the coupling ends of the couplers can move relative the frame. Front and rear wheel weight transfer coupler cylinders 29 and 30 are mounted between the frame and the couplers. A suspension system of springs and shock absorbers is provided for mounting the wheel and axle assemblies 27 and 28 on the frame 22. The system includes springs 31, 32 and shock absorbers 33, 34. It should be appreciated such a suspension is optional, and where it is not desired or needed, the wheel and axle assemblies are mounted solid on the frame. Road wheels 35, 36 are suitably pivotally supported on the frame 22 by crank arms 35a, 36a and are controlled relative to their position on the frame by means of front and rear wheel cylinders 37 and 38 mounted between the frame and crank arms, wherein the cylinders may be activated to move the road wheels to a position below the rail wheels and permit the tractor to operate on a roadway or to the position shown. It should be appreciated that the road wheels, like the rail wheels, are suitably drivingly connected to the engine 24 by means of a suitable transmission and/or gear train, all of which is controllable by the operator in the cab 23.

It may be recognized the present invention only concerns operation of a road-rail tractor while on rails, and therefore the present invention is equally applicable to a rail tractor not having capability of road travel. For example, the present invention could be utilized on the well known switch engine used in freight yards and not capable of road travel.

The weight transfer device of the present invention accomplishes automatic variation in the weight transfer force applied to the rail wheels for effecting suitable traction between the rail wheels and the rails and in accordance with the traction demands of the tractor. It can be appreciated that the traction demands are the highest upon start-up and that the traction demands normally diminish thereafter in accordance with the amount of force necessary to maintain the tractor and the rail cars moving. This force will depend upon the number of rail cars being moved, as well as the speed developed by the tractor and the rail cars. While the weight transfer device of the present invention which effects automatic variation in weight transfer force as needed is shown to operate in conjunction with hydraulic cylinders that accomplish the transfer of force between the couplers and the rail wheels, it should be appreciated that other mechanism may be provided for accomplishing the weight transfer force.

According to the invention, a unique hydraulic circuit for operating the weight transfer cylinders 29 and 30 responds to the traction need of the tractor to automatically control their operation, and automatically apply the necessary amount of weight transfer force to the tractor rail wheels. This hydraulic circuit, as seen in FIG. 2, includes generally a pilot operated solenoid controlled pressure reducing valve assembly 40, together with control valves 41 and 42 which are associated respectively with weight transfer cylinders 29 and 30. The weight transfer control valves 41 and 42, together with a road wheel control valve 43, are actuable within the cab of the tractor wherein operation of one of the weight transfer control valves 41 or 42 to respectively apply a weight transfer force to one of the weight transfer cylinders 29 or 30 effectively connects reducing valve assembly 40 to one or the other of the weight transfer cylinders. Operation of the road wheel control valve 43, also actuable within the cab, controls the up or down positions of the road wheels.

A pressure compensating pump 45 having its inlet connected to tank 46 through a supply line 47 has its outlet connected to a high pressure supply line 48. The pressure compensating pump is of a type commercially available wherein it would be set for maintaining a maximum pressure in the high pressure line 48 and in this application, for example, a pressure of 1500 psi, although capable of adjusting to the set pressure of the circuit. The high pressure line is connected to the reducing valve 40 and also to the road wheel control valve 43 through a check valve 49 49 which prevents backflow from the valve to the line 48. The control valve 43, in the straight-through position 43d as shown, causes the road wheels to be in the down or road-engaging position, and in the cross position 43u, causes the road wheels to be in the up or non-road-engaging position. The control valve 43 is connected to the high pressure line 48 through a supply line 50 and to the road wheel cylinders 37 and 38 through lines 51 and 52 and to return or tank line 53 through line 54. Tank line 53 connects to tank through a suitable filter 55. Accordingly, when the road wheel control valve 43 is in the straight position as illustrated in the drawing, hydraulic fluid under high pressure passes from the high pressure line 48 through the check valve 49, supply line 50, through the valve and through the line 52 to the cylinders to cause the road wheels to move to the down position. The non-pressure side of the cylinders is then connected to the tank line and tank through lines 51, the valve, line 54, and return line 53. Raising of the road wheels is accomplished by moving the control valve to the cross position 43u, which connects the lines leading to and from the control valve such that high pressure then is fed from supply line 50 through the valve and to line 51 and the other ends of the cylinders 37 and 38 to cause the cylinders to drive the road wheels to the up position. The low pressure sides of the cylinders then are connected to tank through the line 52, the valve, line 54 and return line 53. The check valve 49 functions to prevent the road wheels from dropping when the control valve 43 is in cross position and when the pressure drops in the high pressure line 48 by a sudden demand of high pressure for one of the weight transfer cylinders. The control valve 43 may be of the manual type or solenoid operated type.

The weight transfer control valves 41 and 42 function to selectively apply a weight transfer force to one or the other of the weight transfer cylinders, it being appreciated that one of the weight transfer cylinders would be at one end of the tractor while the other would be at the other end of the tractor. It should further be recognized that the tractor may be provided with only a single weight transfer cylinder where there is a coupler at only one end of the tractor. The pilot operated reducing valve assembly 40 is positioned between control valves 43 and 41, and the high pressure line 48, thereby controlling the high pressure to the control valves automatically in response to the traction demands of the tractor. Accordingly, the high pressure line 48a on the discharge end of the pilot operated reducing valve assembly 40 supplies high pressure fluid to the control valves 41 and 42 through lines 56 and 57.

The control valve 41 further includes a port connected to one end of the weight transfer cylinder 29 through line 58, a port connected to the other end of the cylinder through line 59, and a port connected to the return line 53 through line 60. Similarly, the control valve 42 includes a port connected to one end of the weight transfer cylinder 30 through line 61, a port connected to the other end of the cylinder through line 62, and a port connected to the return line 53 through line 63. The control valves 41 and 42 are respectively three-position valves including straight or up positions 41u and 42u, block positions 41b and 42b, and cross or down positions 41d and 42d. When the control valves are in the straight positions 41u and 42u, they respectively cause the pistons in the weight transfer cylinders to move up and apply weight transfer forces to the respective couplers. When the control valves are in the down positions, they cause the pistons in the weight transfer cylinders to move downwardly and remove any weight transfer forces from the couplers. The block positions 41b and 42b are used to lock the weight transfer cylinders in a suitable position whether that be up, down or intermediate, depending upon the needs of the tractor. For example, if full pressure would raise the coupler of a light rail car off its center pin, the valve could be moved to the blocked position with an intermediate pressure to prevent same. The control valves 41 and 42 may be solenoid operated or manually operated, as desired.

The pressure reducing valve assembly 40 functions to supply three different pressures to the weight control cylinders such as a maximum of 1100 psi, an intermediate range of 800 psi and a minimum of 100 psi, depending upon the traction needs of the tractor. The valve assembly 40 includes a pilot controlled pressure reducing valve 65, pilot relief valves 66 and 67, and a three-way solenoid operated control valve 68. The valve 65 includes an inlet pressure port connected to the high pressure line 48, and an outlet pressure port connected to the high pressure supply line 48a feeding the control valves 41 and 42 of the weight transfer cylinders. The amount of pressure permitted through the pressure reducing valve 65 depends upon the position of the spool which is forced in one direction by a spring 65a and pilot pressure at the pilot port 65b, while pilot pressure is also directed to the other end of the spool through pilot port 65c. Pilot pressure is taken from the outlet port of the valve 65 but is orificed to the lower end of the spool through an orifice 65d. Reduction of the pilot pressure at the port 65b decreases the amount of pressure available at the discharge line 48a and therefore the weight transfer force. This pilot pressure at port 65b is controlled by the position of the three-way control valve 68.

The three-position control valve 68 includes a straight position 68a, a blocked position 68b and a cross position 68c. The control valve 68 is solenoid operated by a signal generator 69 which responds to the traction needs of the tractor. The control valve 68 is in the blocked position 68b when no signal is applied to either solenoid of the valve, as illustrated in FIG. 2, wherein only the relief port or drain line of the pilot relief valve 67 is connected to tank through drain line 70 and return line 53, thereby causing the pilot pressure 65b to be set according to pilot relief valve 67 and the lower side of the spool in the pressure reducing valve 65 subjected to this pressure setting. Inasmuch as the pilot valve 67 has the highest pressure setting, for example, 1100 psi, the pressure reducing valve 65 will cause the pressure in the high pressure line 48a leading to the control valve 41 and 42 and ultimately to one of the weight control cylinders to be at the highest possible setting and give maximum weight transfer force. When a signal is applied to the solenoid of valve 68 to cause the straight position 68a to move to the inlet and outlet ports of the valve, the drain line 71 of the pilot relief valve 66 is then connected to tank through the return line 53, thereby causing the pilot pressure at port 56b to equal the setting of the pilot relief valve 66 which is set lower than pilot relief valve 67. This action will essentially bypass pilot relief valve 67. Assuming this is 800 psi, then that pressure will be supplied by the pressure reducing valve 65 to the high pressure line 48a and also to a weight transfer cylinder to reduce the weight transfer force. In the event that the signal generator 69 applies a signal to the other solenoid of the valve 68 so that the cross position 68c is connected to the ports, the pilot port 65b of the pressure reducing valve 65 is then connected directly to tank through line 72, thereby effectively bypassing both pilot relief valves 66 and 67, whereby the minimum pressure setting of the reducing valve in accordance with the spring 65a will supply the lowest pressure to the pressure line 48a and thereby provide the lowest amount of weight transfer force at a weight transfer cylinder. Thus, the control valve 68 adjusts the pilot pressure to pilot port 65b in response to the signal generator 69 which in turn responds to the traction demands to vary the weight transfer forces. The solenoids of valve 68 function as a signal receiving means connected to the signal generator 69.

During application of a weight transfer force to one of the weight transfer cylinders, a relief valve 73 having an inlet connected to the high pressure supply line 48a through the line 56 and its outlet connected to the return line 53 through a drain line 73a responding to a spring force of a spring 73b and the pilot pressure through pilot port 73c relieves any pressure in the weight transfer force cylinder in excess of the set pressure as established by the pilot operated reducing valve 40 such as when the tractor and rail cars might pass over a rough portion of track. Accordingly, the relief valve prevents excessive weight transfer forces to be applied to the tractor, which might possibly damage the tractor or rail car.

Where the road-rail tractor is constructed so that its frame is spring supported from the wheels and thereby provided with shock absorbers between the frame and wheels as illustrated in FIG. 1, it is necessary to load the shock absorbers at the same time a weight transfer force is applied to the tractor so as to prevent bottoming of the springs and damage to the tractor and/or coupled rail car. As seen in FIG. 2, this optional arrangement necessary for spring-supported tractors, is illustrated by the front shock absorbers 33 and the rear shock absorbers 34. It can be appreciated that the cylinders of the shock absorbers would be connected to the frame while the pistons thereof are connected to the wheel carriages in accordance with the hook-up illustrated, although these connections could be reversed if the hook-up to the cylinders is likewise reversed. The lower chambers of the shock absorbers are continually connected to return line 53 so the pistons can readily move downwardly and the frame can readily move away from the wheels, while the upper chambers of the shock absorbers would be connected to the supply or loading pressure of the weight transfer cylinders. Accordingly, the shock absorbers would be stiffened considerably when the weight transfer force is being applied in order to prevent the springs from bottoming. The shock absorbers, when loaded with the weight transfer force pressure, will thereby prevent the tractor and the rail car coupled thereto from taking unusual abuse. Thus, the spring and shock absorber functions are maintained.

The signal generator 69 may take any desired form for applying actuating signals to the solenoid valves, such as being responsive to tractor speed, tractor drive torgue, tractor draft force or the like. For purposes of illustrating this feature, several forms of signal generators are shown in FIGS. 4, 5, 6, 7 and 10, although it should be appreciated that any other form may be used which is responsive to the traction needs of the tractor. Moreover, the signal generating forms, together with the hydraulic circuit of FIG. 2, will produce a stepped variable pressure in the high pressure supply line 48a, while it should be appreciated that a stepless variable pressure may be provided, such as will be hereinafter described in connection with FIG. 3.

The signal generator 69 includes first and second electric signal lines 85 and 86 for controlling the operation of the three-position control valve 68 which functions to control the output of the pilot operated reducing valve 40, and therefore the pressure in supply line 48a.

Figure 4:
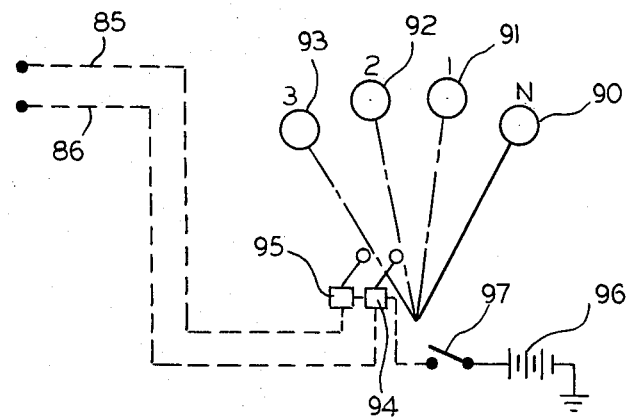
FIG. 4 is a schematic illustration of one form of electric signal generation to operate the hydraulic portion of the weight transfer control in FIG. 2 and particularly where the signal is automatically generated during the manual shifting of the transmission of the tractor.

Referring to FIG. 4, one form of signal generator operates from the manual gear selector of the tractor which includes a neutral position 90, and first, second and third gear positions 91, 92 and 93, Electrical signals are applied to the first and second electric signal lines by closing of normally open electrical switches 94 and 95 which respectively apply an electrical operating signal of a magnitude to energize the solenoids of control valve 68 when the gear shift lever reaches positions 92 and 93 respectively. For purposes of illustrating the electrical signal generator, an electrical power source 96 is provided to the switches 94 and 95 through an on-off switch 97. In operation, when the hydraulic circuit is conditioned to apply the full weight transfer load to one or both of the weight transfer cylinders 29 and 30, this full force will continue as long as the gear shift lever is in the neutral position 90 or the first gear position 91. Upon movement of the gear shift lever to position 92, the control valve 68 is activated to reduce the pressure of the weight transfer cylinders according to the setting of pilot relief valve 66, thereby reducing the weight transfer force on the rail wheels, as can be accomplished when the speed of the tractor is such as to enable use of the second gear shift lever position 92. Thereafter, in the event that it is possible to shift the gear lever to the position 93, actuation of switch 95 and the control valve 68 directly connects the pilot port 65b to tank so the lowest setting of reducing valve 65 still further reduces the weight transfer load at the weight transfer cylinders, as can be accepted when the lesser weight transfer load on the rail wheels is needed. Accordingly, it can be appreciated that the signal generator of FIG. 4 operable from the gear shift lever controls the operation of the pressure reducing valve 40 to thereby control the weight transfer force automatically pursuant to gear selection in the tractor.

Figure 5:
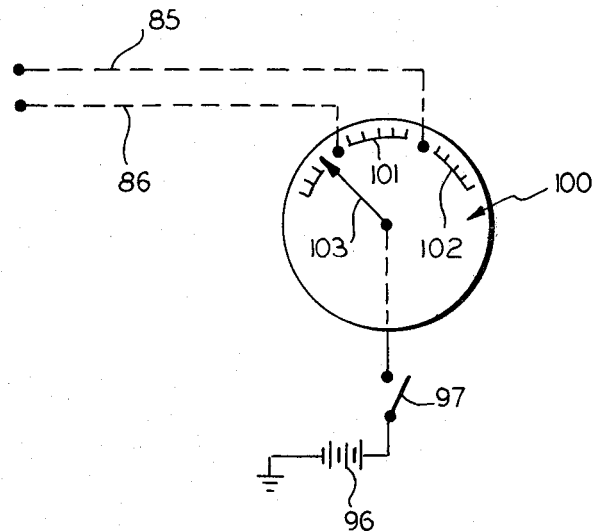
FIG. 5 is a schematic view of another form of electric signal generating means and in particular where the signal is taken from the speed indicator of the tractor.

Another form of signal generator is illustrated in FIG. 5, wherein a speed indicator 100 indicating speed of the tractor in any suitable units, such as miles per hour, rail wheel revolutions per minute, or the like. The indicator includes first and second slide contacts 101 and 102 engageable by a switch arm 103 for applying electrical signals to lines 86 and 85 as the speed of the tractor increases to operate the solenoid control valve 68 and pressure reducing valve 40 in the manner already described in connection with FIG. 4. Accordingly, weight transfer responds to the traction demands as a function of tractor speed with this signal generator.

Another form of signal generator is illustrated in FIG. 6, wherein electrical signals are applied to the signal lines 85 and 86 in response to the hydraulic pressures of the tractor transmission. The engine 24 drives the transmission 105, which is operable by the range selecting valve 106 to provide low, intermediate or high speeds through fluid lines 107, 108 and 109, respectively. When the range selector valve 106 is set to provide an intermediate gear speed for the transmission, the fluid line 108 is energized, thereby operating a pressure responsive switch 110 that applies an electrical signal to the line 86 for actuating the solenoid control valve 68 and reduces the pressure output of pressure reducing valve 40 by activating pilot relief valve 66. Similarly, when the range selector valve 106 is operated for the high gear selection of the transmission, the fluid line 109 is energized, when thereby actuates a pressure responsive switch 111 to apply an electrical signal to the line 85 and actuate the solenoid control valve 68 to connect the pilot port 65b directly to tank and cause a still further reduction of weight transfer force. Accordingly, a stepped weight transfer force can be provided directly from the operation of the transmission by use of the pressure responsive switches 110 and 111.

The signal generator embodiment of FIGS. 7 to 9 responds to the draft force applied to the coupler, whether that be a pushing or pulling force, to thereby control the hydraulic pressure to the coupler cylinder. The coupler, generally identified by the numeral 130, includes a coupling head 131 carried on the end of a stem 132 flanged at 133. A pair of movable ring plates 134 and 135 sandwiching therebetween a donut-shaped resilient pad 136 is carried on the stem 132 between the coupling head 131 and the flange 133. The resilient pad 136 may be of any suitable material, such as synthetic or natural rubber, or of a spring material which normally maintains the ring plates 134 and 135 in separated position, as shown in FIG. 7, when no draft force is being applied to the coupler 130. The ring plates 134 and 135 are carried in an annular supporting member 137 which is in turn mounted to the frame 138 of the tractor. Further, the ring plates 134 and 135 are respectively provided with stops 139 and 140 which coact with abutments 141 and 142 of the annular support member 137, wherein, as seen in FIG. 8, a pulling force on the coupling head 131 squeezes the resilient pad 136 by driving the inner rins plate 135 toward the outer ring plate 134. Conversely, when a pushing force is applied to the coupling head 131, as shown in FIG. 9, the outer ring plate 134 is driven toward the inner ring plate 135 to squeeze the resilient pad 136. In FIG. 9, it is seen the inner ring plate 135 is held in place by the support member 137, while in FIG. 8, it is seen the outer ring plate 134 is held in place by the support member 137. Carried on the inner ring plate 135 is a switch actuating pin 143 which actuates a two-position control switch 144 carried on a bracket 145 extending from the outer ring plate 134. The switch 144 includes a switch arm 146 which, when not engaged as in FIG. 7, produces an electrical signal for line 85 to provide the minimum amount of weight transfer force, and when engaged by the switch actuating pin 143 at one magnitude, produces an electrical signal for line 86 and removes the signal from line 85 to cause the intermediate weight transfer force, and then subsequently upon a greater magnitude of draft force removes the electrical signal from line 86 to cause the maximum weight transfer force.

Referring now to the embodiment of FIG. 3, the weight transfer force control here differs from that of the previous embodiments in that a stepless type of weight transfer force, as opposed to the step type of force provided in the embodiments heretofore described, permits a more gradual change in the weight transfer force responsive to the speed of the tractor. This control operates in conjunction with the regular hydraulic circuit for operating the road wheel cylinders and the coupler cylinders already described in FIG. 2 and is connected to the lines 48, 48a, 53, and the pilot pressure line at the connection points indicated. Primarily, this control differs from the control in FIG. 2 in that a stepless pilot operated pressure reducing valve assembly 155 responds to any change in speed of the tractor as sensed through a tachometer generator 156. The generator is connected at any convenient point on the drive train of the tractor beyond the transmission, so that it responds directly to the speed of the tractor for controlling the weight transfer force accordingly. The valve assembly 155 includes generally a pilot operated pressure reducing valve 157 and a solenoid operated variable pilot relief valve 158 having a solenoid 159 controlled by the tachometer generator 156. The valve 157 is the same as valve assembly 40 in the embodiment of FIG. 2, and the valve 158 effectively takes the place of pilot relief valves 66 and 67 and control valve 68 in the valve assembly 40. The pressure at the outlet port of the valve 157 depends on the pilot pressure at pilot port 157a, which pilot pressure is regulated by the relief valve 158. Thus, valve 157 operates in the same fashion as valve 65, except the pilot pressure is infinitely variable between a maximum and a minimum by operation of relief valve 158.

A battery or electrical potential source 160 is connected in parallel to the tachomemter generator as is the solenoid 159 of the solenoid operated pilot pressure relief valve 158 by conductors 161 and 162. During zero speed of the tachometer, no output is produced by the tachometer generator 156 and the battery 160 therefore applies its full potential to the solenoid 159 to oppose opening of the relief valve 158. Accordingly, the higher the input voltage to the solenoid 159, the greater the pressure in the system and the greater the weight transfer force applied to the rail wheels. As the speed of the tractor increases, the tachometer generator 156 generates a voltage that bucks that of the battery 160 to decrease the input voltage to the solenoid 159 and thereby allow partial opening of the valve 158 to bleed off some of the pressure in the pilot line 163 to cause operation of valve 157 and reduce the pressure in the system and proportionately decrease the weight transfer force of one or both of the coupler cylinders. When the speed of the tractor reaches a predetermined point, the tachometer generator 156 produces an electrical output that completely neutralizes the battery 160, thereby effectively removing any current from the solenoid 159 wherein the only remaining force to urge the relief valve 157 closed is the precompression of the spring 164 which would constitute a fixed value and would provide the lowest possible pressure in the system and the lowest possible weight transfer load to the rail wheels. This would, of course, be a high speed condition for the tractor, and it can be appreciated that the control of this embodiment would therefore infinitely vary the weight transfer force to the rail wheels directly proportional to the speed of the tractor.

The embodiment of FIG. 10 operates similarly to the embodiment of FIGS. 7 to 9 in that it depends upon the draft force of a coupler to vary the weight transfer force, and similar to the embodiment of FIG. 3 in that the weight transfer force is stepless. A potentiometer control 165 is mounted on the coupler and includes an actuating arm 166 which is operable by the switch actuating pin 143 to vary the position of the arm of the potentiometer and vary the electrical output to the output lines 161 and 162 that are connected to the solenoid 159 as shown in FIG. 3. Accordingly, the electrical output will be proportional according to the position of the arm on the potentiometer as dictated by the draft force of the coupler. While the embodiment in FIG. 10 illustrates a pushing draft force, it can be appreciated that a pulling draft force would also actuate the potentiometer 165 in a manner the switch 144 is actuated in FIG. 8. The electrical output to the solenoid 159 would operate in the same fashion as already described in connection with the embodiment of FIG. 3.

From the foregoing, it can be appreciated the present invention provides automatic variable weight transfer loading of a rail tractor coupler in response to the traction needs during both tractor acceleration and deceleration. Accordingly, as a tractor pulling or pushing a load accelerates, the coupler loading will decrease as the traction needs decrease, and as a tractor decelerates, such as by braking, the loading will increase in accordance with the increase in traction needs.

It will be understood that modifications and variations may be effected without departing from the scope of the novel concepts of the present invention, but it is understood that this application is to be limited only by the scope of the appended claims.

The invention is hereby claimed as follows:

1. In a tractor having rail wheels for traveling on rails and for transporting rail cars, said tractor including a coupler for coupling the tractor to a rail car, and means for applying a weight transfer force between the coupler and the rail wheels to transfer a portion of the weight of a rail car connected to the tractor to the rail wheels thereof to increase the traction between the rail wheels and the rails, the improvement comprising: means controlling the weight transfer force applying means to automatically vary the value of the weight transfer force in response to the pulling or pushing traction needs of the tractor when the tractor is moving.

2. In a tractor as defined in claim 1, wherein said means controlling the weight transfer force applying means includes means responsive to the speed of the tractor.

3. In a tractor as defined in claim 1, wherein said means controlling the weight transfer force applying means includes means responsive to the draft force or the traction pull at the coupler of the tractor.

4. A rail tractor for pushing or pulling rail cars on rails comprising: a frame, rail wheels mounted on the frame, means for driving the rail wheels, a coupler movably mounted on the frame, means mounted between the frame and wheels for applying a weight transfer force to the wheels through the coupler by transferring a portion of the weight of a rail car connected to the coupler to increase the traction between the tractor and the rails, and control means for the weight transfer force applying means to automatically vary the value of the weight transfer force in response to the pulling or pushing traction demands of the tractor when the tractor is moving.

5. A rail tractor as defined in claim 4, wherein said control means includes means responsive to the speed of the tractor.

6. A rail tractor as defined in claim 4, wherein said control means includes means responsive to the draft force or the traction pull at the coupler of the tractor.

7. A rail tractor as defined in claim 4, wherein said means for driving the rail wheels includes an engine and a transmission, and said control means includes means responsive to the operation of the transmission.

8. A rail tractor as defined in claim 4, wherein said weight transfer force applying means includes a hydraulic cylinder and a hydraulic circuit for operating the cylinder and for varying the fluid pressure thereto to thereby vary the weight transfer force, said hydraulic circuit including a pressure compensating pump for producing a high pressure fluid source and having an inlet connected to a tank line and an outlet connected to a high pressure supply line, a pilot pressure operated variable pressure reducing valve assembly having an inlet connected to the high pressure supply line and an outlet and signal receiving means for varying the fluid pressure at the outlet, and a control valve having an inlet connected to the outlet of the pressure reducing valve assembly and outlets connected to the opposite ends of the hydraulic cylinder and to tank, and said control means including a signal generator connected to said signal receiving means for producing signals responsive to the traction demands of the tractor.

9. A rail tractor as defined in claim 8, wherein said hydraulic circuit further includes a relief valve having an inlet connected to the inlet of said control valve, an outlet connected to tank and a pilot pressure port connected to the pilot pressure of the pressure reducing valve assembly, whereby sudden increases in the pressure above that set by the pressure reducing valve assembly caused by sudden movements of said rail wheels are relieved.

10. A rail tractor as defined in claim 8, wherein said control valve includes a first control position for operating the hydraulic cylinder to cause a weight transfer force, a second control position for operating the hydraulic cylinder to remove any weight transfer force, and a third control position operable in cooperation with the first control position to cause a weight transfer force of a lesser magnitude than that caused by the first control position.

11. A rail tractor as defined in claim 8, wherein said pilot pressure operated variable pressure reducing valve assembly includes a pilot pressure operated pressure reducing valve having an inlet connected to the inlet of the assembly, an outlet connected to the outlet of the assembly, pilot pressure ports connected to a pilot pressure line, and spring means limiting the minimum outlet pressure, at least one pilot relief valve having an inlet connected to the pilot pressure line and an outlet connected to tank for maintaining the pilot pressure at a set valve, and a control valve operated by the signal receiving means for selectively connecting the pilot pressure line directly to tank and thereby bypass the pilot relief rake so that the pilot operated pressure reducing valve operates at its minimum thereby reducing the pressure at the output of the assembly.

12. A rail tractor as defined in claim 8, wherein said pilot pressure operated variable pressure reducing valve assembly includes a pilot pressure operated pressure reducing valve having an inlet connected to the inlet of the assembly, an outlet connected to the outlet of the assembly, pilot pressure ports connected to a pilot pressure line, and spring means limiting the minimum outlet pressure, a variable pilot relief valve having an inlet connected to the pilot pressure line and an outlet connected to tank, said signal receiving means controlling said variable pilot relief valve to vary the pilot pressure and thereby the operation of the pilot operated pressure reducing valve, and said signal generator including a speed indicator producing a signal for the signal receiving means directly proportional to the speed of the tractor.

13. A rail tractor as defined in claim 8, wherein said pilot pressure operated variable pressure reducing valve assembly a pilot pressure operated pressure reducing valve having an inlet connected to the inlet of the assembly, an outlet connected to the outlet of the assembly, pilot pressure ports connected to a pilot pressure line, and spring means limiting the minimum outlet pressure, a first pilot relief valve having an inlet connected to the pilot pressure line and an outlet connected to tank for maintaining the pilot pressure at a set value greater than the minimum of said reducing valve, a second pilot relief valve having an inlet connected to the pilot pressure line and an outlet and a set pressure value less than the first relief valve and greater than the reducing valve, a control valve operated by the signal receiving means and including an inlet port connected to the outlet of said second pilot relief valve, an outlet port connected to tank, and an outlet port connected to the pilot pressure line, said control valve having a block position thereby causing the output pressure of the assembly to be controlled by the first pilot relief valve, a straight position connecting the inlet and outlet ports to thereby connect the outlet of said second pilot relief valve to tank and causing the output pressure of the assembly to drop, and a cross position connecting the outlet ports to thereby connect the pilot pressure line directly to tank and cause the output pressure of the assembly to further drop.

14. A rail tractor as defined in claim 4, wherein said weight transfer force applying means includes a hydraulic cylinder and a hydraulic circuit for operating the cylinder and for varying the fluid pressure thereto to thereby vary the weight transfer force, said hydraulic circuit including means for producing a source of high pressure fluid, a pressure reducing valve means having an inlet connected to said source and an outlet and signal receiving means for varying the fluid pressure at the outlet, and a control valve having an inlet connected to the outlet of the pressure reducing valve means and outlets connected to the opposite ends of the hydraulic cylinder and to tank for selectively applying a weight transfer pressure to the cylinder, and said control means including a signal generator connected to said signal receiving means for producing signals responsive to the traction demands of the tractor.

15. A rail tractor as defined in claim 14, wherein the tractor further includes springs and shock absorbers mounted between the frame and rail wheels, and means connecting the shock absorbers to the outlet of the control valve which feeds weight transfer pressure to the cylinder to load the shock absorbers and stiffen same during application of a weight transfer force to the rail wheels.

16. A rail tractor as defined in claim 4, wherein said weight transfer force applying means includes a hydraulic cylinder and a hydraulic circuit for operating the cylinder and for varying the fluid pressure thereto to thereby vary the weight transfer force, and wherein the tractor further includes springs and shock absorbers mounted between the frame and rail wheels, and means connecting the shock absorbers to the same pressure as the hydraulic cylinder to load the shock absorbers and stiffen same during application of weight transfer forces to the rail wheels.

17. In a road-rail tractor having rail wheels for traveling on rails, said tractor including an engine and transmission for driving the wheels, a coupler for coupling the tractor to a rail car, and means for applying a weight transfer force between the coupler and rail wheels to transfer a portion of the weight of the rail car to the tractor rail wheels to increase the traction between the tractor rail wheels and the rails, the improvement comprising: means for controlling the weight transfer force applying means to automatically vary the value of the weight transfer force in response to the pulling or pushing traction needs of the tractor when the tractor is moving.

18. In a road-rail tractor as defined in claim 17, wherein said weight transfer force controlling means includes means responsive to the rail speed of the tractor.

19. In a road-rail tractor as defined in claim 17, wherein said weight transfer force controlling means includes means responsive to the draft force or traction pull at the coupler of the tractor.

20. In a road-rail tractor as defined in claim 17, wherein said weight transfer force controlling means includes means responsive to the operation of the tractor transmission.

21. In a road-rail tractor having road wheels for traveling on the road and rail wheels for traveling on rails, said tractor including an engine and a drive train between the engine and wheels for driving same, first hydraulic cylinder means for moving the road wheels between retracted and road engaging positions, a coupler for coupling the tractor to a rail car, second hydraulic cylinder means for applying a weight transfer force between the coupler and the rail wheels, hydraulic circuit means for selectively operating said first and second cylinder means, the improvement comprising: weight transfer control means responding to the pulling or pushing rail traction needs of the tractor for automatically varying the value of the weight transfer force between a maximum where maximum traction is needed to a minimum where minimum traction is needed when the tractor is moving.

22. In a road-rail tractor as defined in claim 21, wherein said weight transfer control means further includes control valve means for connecting the pressure reducing valve means to said second hydraulic cylinder means, and signal generating means responsive to the speed of the tractor for actuating said control valve means.

23. In a road-rail tractor as defined in claim 22, wherein said drive train includes a transmission having a selector level for selecting the range of operation, and wherein said signal generating means includes first and second switches operable by said selector lever for generating signals for actuating said control valve means.

24. In a road-rail tractor as defined in claim 22, wherein said drive train includes a transmission having low, intermediate and high fluid pressure lines operable from a range selection valve, and pressure responsive switches in the intermediate and high pressure lines for respectively generating signals for actuating said control valve means.

25. In a road-rail tractor as defined in claim 22, wherein said signal generating means includes a speed indicator having first and second switches for generating signals for actuating said control valve means.

26. In a road-rail tractor as defined in claim 21, wherein said weight transfer control means includes pressure reducing valve means for reducing the pressure to said second hydraulic cylinder means and therefore the weight transfer force.

27. In a road-rail tractor as defined in claim 26, wherein said weight transfer control means further includes control valve means for connecting the pressure reducing valve means to said second hydraulic cylinder means, and signal generating means responsive to the draft force at the coupler for actuating said control valve means.

28. In a road-rail tractor as defined in claim 27, wherein said signal generating means includes a two-position switch coacting with said coupler to sense draft force and generate signals for said control valve means.

29. In a road-rail tractor as defined in claim 27, wherein said signal generating means includes a potentiometer coacting with said coupler to sense draft force and generate a stepless signal for said control valve means proportionally to the draft force.

30. In a road-rail tractor as defined in claim 26, wherein said weight transfer control means further includes signal generating means responsive to the speed of the tractor for actuating said pressure reducing valve means proportionally to the speed.

31. In a road-rail tractor as defined in claim 30, wherein said pressure reducing valve means includes a pilot pressure operated pressure reducing valve having a pilot port and a spring limiting the minimum pressure reduction position thereof and a solenoid operated pilot pressure relief valve controlling the pilot pressure controlling the reducing valve between maximum and minimum pressure positions, and said signal generating means connected to and controlling the energization of the solenoid operated pilot pressure relief valve proportional to the speed of the tractor and including a battery supply and a tachometer generator connected in parallel and so the potential of the generator opposes that of the battery supply.

* * * * *

UNITED STATES PATENT AND TRADEMARK OFFICE
CERTIFICATE OF CORRECTION

PATENT NO. : 3,884,156
DATED : May 20, 1975
INVENTOR(S) : Victor H. Ames and Marshall V. Hartelius It is certified that error appears in the above-identified patent and that said Letters Patent are hereby corrected as shown below:

Col. 1, line 20, change "traction" to --tractor--;
Col. 2, line 4, after "road-rail" insert --tractor--;
Col. 7, line 30, change "torgue" to --torque--;
Col. 8, line 44, change "when" to --which--;
Col. 9, line 8, change "rins" to --ring--; and
Col. 12, line 25, change "rake" to --valve--.

Signed and Sealed this second Day of December 1975

[SEAL]

Attest:

RUTH C. MASON
*Attesting Officer*

C. MARSHALL DANN
*Commissioner of Patents and Trademarks*